US011181458B2

(12) United States Patent
Bai et al.

(10) Patent No.: US 11,181,458 B2
(45) Date of Patent: Nov. 23, 2021

(54) METHOD FOR PROCESSING FILTER TO OBTAIN CALIBRATION DUST FILTER, AND METHOD FOR OFF-SITE CALIBRATION USING CALIBRATION DUST FILTER

(71) Applicant: Chinese Research Academy of Environmental Sciences, Beijing (CN)

(72) Inventors: Zhipeng Bai, Beijing (CN); Wen Yang, Beijing (CN); Xinhua Wang, Beijing (CN); Chunmei Geng, Beijing (CN); Jing Wang, Beijing (CN); Baohui Yin, Beijing (CN); Bin Han, Beijing (CN); Xiujun Zhu, Beijing (CN); Xia Zhang, Beijing (CN); Xueyan Zhao, Beijing (CN); Yan Jiang, Beijing (CN); Xiaoli Wang, Beijing (CN); Wengang Sheng, Beijing (CN); Junfeng Guo, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 682 days.

(21) Appl. No.: 16/076,110

(22) PCT Filed: Jul. 31, 2017

(86) PCT No.: PCT/CN2017/095103
§ 371 (c)(1),
(2) Date: Aug. 7, 2018

(87) PCT Pub. No.: WO2018/171097
PCT Pub. Date: Sep. 27, 2018

(65) Prior Publication Data
US 2021/0010921 A1 Jan. 14, 2021

(30) Foreign Application Priority Data
Mar. 20, 2017 (CN) .................. 201710165073.X

(51) Int. Cl.
G01N 15/06 (2006.01)
G01N 23/06 (2018.01)
G01N 5/02 (2006.01)

(52) U.S. Cl.
CPC .......... *G01N 15/0618* (2013.01); *G01N 5/02* (2013.01); *G01N 23/06* (2013.01); *G01N 2015/0662* (2013.01)

(58) Field of Classification Search
CPC ....... G01N 15/0618; G01N 2015/0662; G01N 23/06
See application file for complete search history.

(56) References Cited

U.S. PATENT DOCUMENTS

2010/0163761 A1* 7/2010 Febo .................. G01N 15/0618
250/573

FOREIGN PATENT DOCUMENTS

CN 101542267 A 9/2009
CN 102980840 A 3/2013
(Continued)

OTHER PUBLICATIONS

Winberry, William T., Jr., et al. "Compendium Method IO-1.2 Db Iermination of PM10 in Ambient Air Using the Thermo Environmental Instruments (Formerly Wedding and Associates) Continuous Beta Attenuation Monitor" EPA/625/R-96/010a, Jun. 1999. (Year: 1999).*
(Continued)

*Primary Examiner* — Paul M. West
(74) *Attorney, Agent, or Firm* — Fox Rothschild LLP

(57) ABSTRACT

The present invention provides a method for processing a filter to obtain a calibration dust filter, and a method for off-site calibration using the calibration dust filter. In the present invention, a batch of filters that meets specific requirements is screened out as the basal filters, and then the basal filters are processed in an actual environment to obtain the calibration dust filters. The counted number of beta particles is measured before and after sampling, and then a (Continued)

correction factor K is inversely inferred. The beta attenuation suspended particulate analyzer is corrected using the correction factor K. It can be known from a calculation result in an embodiment that, when the beta attenuation suspended particulate analyzer is calibrated using the calibration dust filter, the concentration measured by the calibrated beta attenuation suspended particulate analyzer is more closer to the manually measured concentration, with a CV value roughly equal to 7% to 8%, thus better reflecting variations in pollution concentration of PM in the air.

19 Claims, 1 Drawing Sheet

(56) References Cited

FOREIGN PATENT DOCUMENTS

| | | |
|---|---|---|
| CN | 103760079 A | 4/2014 |
| CN | 203561570 U | 4/2014 |
| CN | 203949849 U | 11/2014 |
| CN | 104865150 A | 8/2015 |

OTHER PUBLICATIONS

"Sampling and determining aerosols and their chemical components" The MAK-Collection Part III: Air Monitoring Methods, vol. 9. DFG, Deutsche Forschungsgemeinschaft, 2005. (Year: 2005).*

* cited by examiner

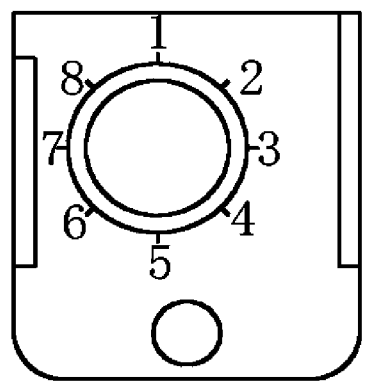

METHOD FOR PROCESSING FILTER TO OBTAIN CALIBRATION DUST FILTER, AND METHOD FOR OFF-SITE CALIBRATION USING CALIBRATION DUST FILTER

The present application claims priority to Chinese Patent Application No. CN201710165073.X filed on Mar. 20, 2017 and entitled "METHOD FOR PROCESSING FILTER TO OBTAIN CALIBRATION DUST FILTER, AND METHOD FOR OFF-SITE CALIBRATION USING CALIBRATION DUST FILTER", which is incorporated herein by reference in its entirety.

TECHNICAL FIELD

The present invention relates to the technical field of particulate matter detection, and in particular, to a method for processing a filter to obtain a calibration dust filter, and a method for off-site calibration using the calibration dust filter.

BACKGROUND

At present, an automatic beta attenuation particulates analyzer is widely applied at home and aboard, which performs quantitative analysis according to a relationship between the intensity of the beta ray detected by a detector and the content of to-be-measured matter. Its theoretical basis is a beta absorption law. The beta absorption law refers to a phenomenon that an interaction occurs when the beta ray passes through absorbing matter, resulting in intensity attenuation. The intensity attenuation is also called ray absorption by matter. An intensity change of the beta ray is relevant to the concentration and mass thickness of the matter, and a mass absorption coefficient. The beta absorption law is shown by Equation IV:

$$I_1' = I_0' \cdot e^{-\mu_a t_a} \qquad \text{Equation IV}$$

In Equation IV:

$I_0'$ represents the counted number of beta particles that pass through a blank filter tape;

$I_1'$ represents the counted number of beta particles that pass through a filter tape coated with particulate matter;

$\mu_a$ represents a mass absorption coefficient, which is relevant to merely the sample material (cm$^2$/mg); $\mu_a$ slowly increases as the atomic number increases for different absorbing matter, and $\mu_a$ is relevant to the radiation energy for the same absorbing matter, an empirical value thereof being 0.29 cm$^2$/mg; and $t_a$ represents the mass thickness (ag/cm$^2$).

However, a standard filter used for the automatic beta attenuation particulates analyzer is self-produced by the manufacturers, thus failing to realize traceability and unification of the quantity values. In addition, calibration filters used as standard matter are mostly made by using an organic compound material, and a measurement result is greatly affected by particulate compositions.

SUMMARY

To overcome the foregoing defects in the prior art, the present invention provides a method for processing a filter to obtain a calibration dust filter, and a method for off-site calibration using the calibration dust filter.

To solve the foregoing technical problems, the present invention adopts the following technical solutions: A method for processing a filter to obtain a calibration dust filter includes the following steps:

(1) fundamentally screening basal filters, to obtain blank basal filters to be measured, where standards for the fundamental screening are as follows:

a. the aperture diameter and thickness: the aperture diameter is less than or equal to 2 μm, and the thickness ranges from 0.2 mm to 0.25 mm;

b. the interception efficiency: the interception efficiency for 0.3 μm particulate matter is greater than or equal to 99% when the basal filter is used as a sampling filter for PM10; and the interception efficiency for 0.3 μm particulate matter is greater than or equal to 99.7% when the basal filter is used as a sampling filter for PM2.5;

c. the maximum pressure drop: the pressure drop is less than or equal to 3 KPa at the dean air flow rate of 0.45 m/s;

d. the maximum moisture absorption: mass increments obtained after the basal filter is exposed to the air with the humidity of 40% RH and the humidity of 35% RH separately for 24 hours are less than or equal to 10 μg; and e. weight stability: a change of average mass in a falling test is less than or equal to 20 μg, and a change of average mass in a temperature test is less than or equal to 20 μg;

(2) measuring, by using an external diaphragm measurement function of a beta attenuation particulate analyzer, the initial intensity of the beta ray when no filter is placed, and recording the intensity as I; placing the blank basal filter to be measured on a filter holder, and equally dividing the filter holder at a particular angle with several point positions; measuring the intensity of the beta ray on the different point positions, and recording the intensity as I", to obtain ln(I/I") values of the different point positions, n being mark numbers of the different point positions;

performing stability screening according to the obtained ln(I/I") values of the blank basal filters to be measured: screening the same blank basal filter to be measured and using it as a first-grade stable basal filter if the variable coefficient CV for ln(I/I") values of the different point positions thereof is less than or equal to 0.20%; and calculating an average of ln(I/I") values of different point positions on each first-grade stable basal filter, to obtain an ln(I/I") average of each first-grade stable basal filter; and according to the ln(I/I") averages, screening out at least ten second-grade stable basal filters of which the variable coefficients CVs of the ln(I/I") averages are less than or equal to 0.25%;

(3) weighing the second-grade stable basal filters that are screened out in step (2); and (4) reserving at least one second-grade stable basal filter as a blank comparison filter; and dividing the remaining second-grade stable basal filters into at least three groups, each group including at least three filters as experimental filters for collecting calibration dust; and weighing the obtained second-grade stable basal filters to which the calibration dust is adhered, to obtain a mass difference value before and after sampling of the filters, and calculating PM mass concentration accordingly; and (5) measuring, by using the external diaphragm measurement function of the beta attenuation particulate analyzer, the initial intensity of the beta ray when no filter is placed, and recording the intensity as I'; placing the second-grade stable basal filter to which the calibration dust is adhered on the filter holder; and measuring the intensity of the beta ray on different point positions set according to step (2), and recording the intensity as I''', to obtain ln(I'/I''') values of different point positions, n being mark numbers of the different point positions; and screening the same second-grade stable basal filter to which the calibration dust is adhered, and using it as a calibration dust filter if the variable coefficient CV for ln(I'/I''') values of the different point positions thereof is less than or equal to 0.20%.

Preferably, the basal filter is a cellulose filter, glass fiber filter, quartz fiber filter, teflon filter, or polycarbonate filter.

Preferably, when the basal filter is a quartz fiber filter, the quartz fiber filter is baked.

Preferably, the baking temperature is 800° C. to 900° C.; and the baking duration is 30 to 90 minutes.

Preferably, the temperature rises to the baking temperature in a temperature rise manner of first temperature rising, first temperature preservation, second temperature rising, second temperature preservation, and then third temperature rising.

Preferably, the rise rate of the first temperature rising is 4° C./min to 6° C./min;

the temperature in the first temperature preservation is 290° C. to 310° C.; and the duration of the first temperature preservation is 1 hour to 3 hours.

Preferably, the rise rate of the second temperature rising is 4° C./min to 6° C./min;

the temperature in the second temperature preservation is 490° C. to 510° C.; and the duration of the second temperature preservation is 1 hour to 3 hours.

Preferably, the rise rate of the third temperature rising is 9° C./min to 1° C./min.

Preferably, a method for testing the weight stability is as follows:

selecting filters, the number of which is not less than 0.1% of the total number of filters in each batch, weighing them after they are stabilized in equilibrium, and recording the mass of the filters;

placing the filters that have been weighed in equilibrium into a filter dip, making the filter dip freely fall to a flat hard surface from the height of 25 cm, and repeating the foregoing operations twice; and taking the tested filters out of the filter dip, and weighing the tested filters and recording mass values, where a change of average mass before and after the falling test is less than or equal to 20 μg; and drying the filters that have been weighed in equilibrium at 40±2° C. for 48 hours, and then weighing the dried filters again in equilibrium, where a change of average mass before and after the test is less than or equal to 20 μg.

Preferably, the temperature during the stabilization in equilibrium is 15° C. to 30° C.;

the relative humidity during the stabilization in equilibrium is 45% to 55%; and the duration of the stabilization in equilibrium is 20 hours to 30 hours.

Preferably, the particular angle is 90°, 60°, 45°, 30° or 20°.

Preferably, the weighing in steps (3) and (4) is performed individually under constant temperature and humidity conditions;

the temperature in the constant temperature and humidity conditions is 19° C. to 21° C.; and the humidity in the constant temperature and humidity conditions is 45% to 55%.

The present invention further provides a method for off-site calibration using a calibration dust filter, which includes the following steps:

a. obtaining a calibration dust filter according to the method described in any item of the foregoing technical solutions;

b. measuring, by using an external diaphragm measurement function of a beta attenuation particulate analyzer, the intensity of the beta ray on different point positions on a reserved blank comparison filter, and recording the intensity as $I_n$; calculating an average of the $I_n$ values to obtain average intensity of the beta ray for the blank comparison filters, and recording the intensity as $\overline{I_n}$; calculating an average of the I''' values of different point positions on each calibration dust filter to obtain average intensity of the beta ray for each calibration dust filter, and recording the intensity as $\overline{I'''}$; and calculating a value of a correction factor K according to Equation I:

$$K = \frac{\Delta m}{S \cdot t_m} \quad \text{Equation I}$$

where in Equation I:

S represents the area of the dust filter, using $cm^2$ as a unit;

$\Delta m$ represents a mass difference value before and after sampling of the filters, using mg as a unit; and $t_m$ represents the mass thickness, using $mg/cm^2$ as a unit, where $t_m$ is calculated according to Equation II:

$$t_m = \frac{\ln(\overline{I_n/I'''})}{\mu_m} \quad \text{Equation II}$$

where in Equation II, $\mu_m$ is the mass absorption coefficient, and the empirical value is 0.29 $cm^2/mg$; and c. correcting and calibrating the beta attenuation particulate analyzer by using the obtained value of the correction factor K.

Preferably, the correction and calibration is as follows: substituting the correction factor K into Equation III, to obtain corrected concentration of particulate matter after calculation:

$$C = \frac{S}{V} \cdot t_m \cdot k \quad \text{Equation III}$$

where in Equation III:

S represents the area of the dust filter, using $cm^2$ as a unit;

V represents the volume under standard conditions, using $m^3$ as a unit;

$t_m$ represents the mass thickness, using $mg/cm^2$ as a unit; and

K represents the obtained correction factor.

The present invention provides a method for processing a filter to obtain a calibration dust filter, and a method for off-site calibration using the calibration dust filter. In the present invention, a batch of filters that meet specific requirements are screened out as the basal filters, and then the basal filters are processed in an actual environment to obtain the calibration dust filters. The counted number of beta particles is measured before and after sampling, and then a correction factor K is inversely inferred. The beta attenuation suspended particulate analyzer is corrected using the correction factor K. It can be known from a calculation result in an embodiment that, when the beta attenuation suspended particulate analyzer is calibrated using the calibration dust filter, the concentration measured by the calibrated beta attenuation suspended particulate analyzer is more closer to the manually measured concentration, with a CV value roughly equal to 7% to 8%, thus better reflecting variations in pollution concentration of PM in the air.

BRIEF DESCRIPTION OF THE DRAWING

FIG. 1 is a schematic top view of a filter holder with a filter placed thereon in Embodiment 1 of the present invention.

DETAILED DESCRIPTION

The present invention is further described below with reference to the accompanying drawings and embodiments.

The present invention provides a method for processing a filter to obtain a calibration dust filter, which includes the following steps:

(1) Basal filters are fundamentally screened, to obtain blank basal filters to be measured. Standards for the fundamental screening are as follows:
  a. the aperture diameter and thickness: the aperture diameter is less than or equal to 2 μm, and the thickness ranges from 0.2 mm to 0.25 mm;
  b. the interception efficiency: the interception efficiency for 0.3 μm particulate matter is greater than or equal to 99% when the basal filter is used as a sampling filter for PM10; and the interception efficiency for 0.3 μm particulate matter is greater than or equal to 99.7% when the basal filter is used as a sampling filter for PM2.5;
  c. the maximum pressure drop: the pressure drop is less than or equal to 3 KPa at the dean air flow rate of 0.45 m/s;
  d. the maximum moisture absorption: mass increments obtained after the basal filter is exposed to the air with the humidity of 40% RH and the humidity of 35% RH separately for 24 hours are less than or equal to 10 μg; and
  e. weight stability: a change of average mass in a falling test is less than or equal to 20 μg, and a change of average mass in a temperature test is less than or equal to 20 μg;

(2) The initial intensity of the beta ray when no filter is placed is measured by using an external diaphragm measurement function of a beta attenuation particulate analyzer, and the intensity is recorded as I. The blank basal filter to be measured is placed on a filter holder, and the filter holder is equally divided at a particular angle with several point positions. The intensity of the beta ray on the different point positions is measured, and is recorded as I″, to obtain ln(I/I″) values of the different point positions, n being mark numbers of the different point positions.

Stability screening is performed according to the obtained ln(I/I″) values of the blank basal filters to be measured. Specifically, the same blank basal filter to be measured is screened and used as a first-grade stable basal filter if the variable coefficient CV for ln(I/I″) values of the different point positions thereof is less than or equal to 0.20%.

An average of ln(I/I″) values of different point positions on each first-grade stable basal filter is calculated, to obtain an ln(I/I″) average of each first-grade stable basal filter; and according to the ln(I/I″) averages, at least ten second-grade stable basal filters of which the variable coefficients CVs of the ln(I/I″) averages are less than or equal to 0.25% are screened out.

(3) The second-grade stable basal filters that are screened out in step (2) are weighed.

(4) At least one second-grade stable basal filter is reserved as a blank comparison filter; and the remaining second-grade stable basal filters are divided into at least three groups, each group including at least three filters as experimental filters for collecting calibration dust.

The obtained second-grade stable basal filters to which the calibration dust is adhered are weighed, to obtain a mass difference value before and after sampling of the filters, and PM mass concentration is calculated accordingly.

(5) The initial intensity of the beta ray when no filter is placed is measured by using the external diaphragm measurement function of the beta attenuation particulate analyzer, and the intensity is recorded as I'. The second-grade stable basal filter to which the calibration dust is adhered is placed on the filter holder. The intensity of the beta ray on different point positions set according to step (2) is measured, and is recorded as I'″, to obtain ln(I'/I'″) values of different point positions, n being mark numbers of the different point positions.

The same second-grade stable basal filter to which the calibration dust is adhered is screened, and it is used as a calibration dust filter if the variable coefficient CV for ln(I″/I'″) values of the different point positions thereof is less than or equal to 0.20%.

In the present invention, the basal filters are fundamentally screened, to obtain blank basal filters to be measured. The present invention does not particularly limit the types of the basal filters, and filters that are used by the beta attenuation particulate analyzer for particulate matter measurement can be selected. In the embodiment of the present invention, the basal filter is preferably a cellulose filter, glass fiber filter, quartz fiber filter, teflon filter, or polycarbonate filter.

The present invention does not have any special requirements for the source of the basal filter, and can use a basal filter known to those skilled in the art. Specifically, a commercially available basal filter can be used.

In the present invention, when the basal filter is a quartz fiber filter, the quartz fiber filter is preferably baked in the present invention. In the present invention, the baking temperature is preferably 800° C. to 900° C., is more preferably 820° C. to 880° C., and is most preferably 840° C. to 860° C. The baking duration is preferably 30 to 90 minutes, is more preferably 40 to 80 minutes, and is most preferably 50 to 60 minutes. In the present invention, the baking processing is preferably conducted in a muffle furnace. In the present invention, residual impurities on the quartz fiber filter can be eliminated through the baking processing.

In the present invention, preferably, the temperature rises to the baking temperature in a temperature rise manner of first temperature rising, first temperature preservation, second temperature rising, second temperature preservation, and then third temperature rising. In the present invention, the temperature in the first temperature preservation is reached after the first temperature rising. In the present invention, the rise rate of the first temperature rising is preferably 4° C./min to 6° C./min; is more preferably 4.5° C./min to 5.5° C./min; and is most preferably 5° C./min. In the present invention, the temperature in the first temperature preservation is preferably 290° C. to 310° C.; is more preferably 295° C. to 305° C.; and is most preferably 300°

C. The duration of the first temperature preservation is 1 hour to 3 hours, which may be specifically 1 hour, 2 hours, or 3 hours.

In the present invention, after the first temperature preservation ends, the temperature in the second temperature preservation is reached after the second temperature rising. In the present invention, the rise rate of the second temperature rising is 4° C./min to 6° C./min; is more preferably 4.5° C./min to 5.5° C./min; and is most preferably 5° C./min. In the present invention, the temperature in the second temperature preservation is preferably 490° C. to 510° C.; is more preferably 495° C. to 505° C.; and is most preferably 500° C. The duration of the second temperature preservation is 1 hour to 3 hours, which may be specifically 1 hour, 2 hours, or 3 hours.

In the present invention, after the second temperature preservation ends, the baking temperature is reached after the third temperature rising. In the present invention, the rise rate of the third temperature rising is preferably 9° C./min to 11° C./min; is more preferably 9.5° C./min to 10.5° C./min; and is most preferably 10° C./min.

In the present invention, preferably, basal filters are preliminarily screened, and then basal filters obtained after the preliminary screening are fundamentally screened. The preliminary screening requires that the filters have small color difference and uniform thickness, no pinholes, and no burrs on the whole.

In the present invention, standards for the fundamental screening are as follows:
a. the aperture diameter and thickness: the aperture diameter is less than or equal to 2 μm, and the thickness ranges from 0.2 mm to 0.25 mm;
b. the interception efficiency: the interception efficiency for 0.3 μm particulate matter is greater than or equal to 99% when the basal filter is used as a sampling filter for PM10; and the interception efficiency for 0.3 μm particulate matter is greater than or equal to 99.7% when the basal filter is used as a sampling filter for PM2.5;
c. the maximum pressure drop: the pressure drop is less than or equal to 3 KPa at the clean air flow rate of 0.45 m/s;
d. the maximum moisture absorption: mass increments obtained after the basal filter is exposed to the air with the humidity of 40% RH and the humidity of 35% RH separately for 24 hours are less than or equal to 10 μg; and
e. weight stability: a change of average mass in a falling test is less than or equal to 20 μg, and a change of average mass in a temperature test is less than or equal to 20 μg.

In the present invention, a method for testing the weight stability is as follows:
selecting filters, the number of which is not less than 0.1% of the total number of filters in each batch, weighing them after they are stabilized in equilibrium, and recording the mass of the filters;
placing the filters that have been weighed in equilibrium into a filter dip, making the filter dip freely fall to a flat hard surface from the height of 25 cm, and repeating the foregoing operations twice; and taking the tested filters out of the filter clip, and weighing the tested filters and recording mass values, where a change of average mass before and after the falling test is less than or equal to 20 μg; and
drying the filters that have been weighed in equilibrium at 40±2° C. for 48 hours, and then weighing the dried filters again in equilibrium, where a change of average mass before and after the test is less than or equal to 20 μg.

In the present invention, the temperature during the stabilization in equilibrium is preferably 15° C. to 30° C.; is more preferably 20° C. to 25° C.; and is most preferably 22° C. to 23° C. The relative humidity during the stabilization in equilibrium is preferably 45% to 55%; is more preferably 48% to 53%; and is most preferably 50%. The duration of the stabilization in equilibrium is preferably 20 to 30 hours; is more preferably 22 to 28 hours; and is most preferably 25 hours.

In the present invention, in the process of testing the weight stability, the filters that have been weighed in equilibrium are placed into the filter dip, which can fasten the filters, and prevent the filters from being damaged or contaminating a desk.

After the blank basal filter to be measured is screened out, the initial intensity of the beta ray when no filter is placed is measured by using the external diaphragm measurement function of the beta attenuation particulate analyzer, and the intensity is recorded as I. The present invention does not have any particular requirement for the type of the beta attenuation particulate analyzer, and any domestic or foreign beta attenuation particulate analyzer known to persons skilled in the art can be used. In a specific embodiment of the present invention, the beta attenuation particulate analyzer is preferably the Model 7201 beta attenuation suspended particulate analyzer produced by Beijing Zhong Sheng Tal Ke Environment Science & Technology Development Co., Ltd. The present invention does not have any particular requirement for the method for testing the initial intensity I of the beta ray, and the test method can be performed in accordance with operation instructions of the beta attenuation particulate analyzer.

After the initial intensity I of the beta ray when no filter is placed is obtained after measurement, the blank basal filter to be measured is placed on a filter holder, and the filter holder is equally divided at a particular angle with several point positions. The intensity of the beta ray on the different point positions is measured, and is recorded as I″, to obtain ln(I/I″) values of the different point positions, n being mark numbers of the different point positions.

In the present invention, preferably, the screened-out blank basal filter to be measured is cropped, so as to meet requirements of external calibration filter holders of different shapes and models. In some specific embodiments of the present invention, the blank basal filter to be measured is cropped into a circular shape.

The present invention does not have any particular requirement for the angle value of the particular angle, and the filter can be equally divided at any angle. In the present invention, the angle is preferably 90°, 60°, 45°, 30° or 20°. In some specific embodiments of the present invention, the mark numbers of the different point positions preferably starts from 1, which are specifically 1, 2, 3, 4, 5 . . . .

In the present invention, stability screening is performed according to the obtained ln(I/I″) values of the blank basal filters to be measured. Specifically, the same blank basal filter to be measured is screened and used as a first-grade stable basal filter if the variable coefficient CV for ln(I/I″) values of the different point positions thereof is less than or equal to 0.20%. The present invention does not have any particular requirement for a manner of calculating the variable coefficient CV, and any manner of calculating the variable coefficient CV known to persons skilled in the art can be used. The variable coefficient refers to a ratio of an original data standard deviation to an original data mean.

In the present invention, an average of ln(I/I″) values of different point positions on each first-grade stable basal filter is calculated, to obtain an ln(I/I″) average of each first-grade stable basal filter; and according to the ln(I/I″) averages, at least ten second-grade stable basal filters of which the variable coefficients CVs of the ln(I/I″) averages are less than or equal to 0.25% are screened out.

The second-grade stable basal filters that are screened out are weighed in the present invention. In the present invention, the second-grade stable basal filters are weighed preferably under constant temperature and humidity conditions. The temperature in the constant temperature and humidity conditions is preferably 19° C. to 21° C.; and is more preferably 20° C. The humidity in the constant temperature and humidity conditions is 45% to 55%; is more preferably 48% to 53%; and is most preferably 50%. In the present invention, a high-precision weighing scale is preferably used for weighing. The precision of the high-precision weighing scale is preferably 0.01 mg or 0.001 mg.

In the present invention, after the second-grade stable basal filters are weighed, at least one second-grade stable basal filter is reserved as a blank comparison filter; and the remaining second-grade stable basal filters are divided into at least three groups, each group including at least three filters as experimental filters for collecting calibration dust. In the present invention, the remaining second-grade stable basal filters are divided into at least three groups, which can avoid a deviation caused by uncontrollable factors such as the operations, weather, and instruments, and thus further avoid a large deviation in a certain data set. In the present invention, multiple groups of filters are used to do a parallel test. Therefore, data having a severe deviation can be obviously determined, and is removed then.

As a specific embodiment of the present invention, a sampler with a flow rate of 16.7 L/min is preferably selected during collection of the calibration dust. The sampler is used for collection of the calibration dust. In the present invention, the sampler uses the multiple groups of experimental filters to conduct the collection of the calibration dust. The filter is overlaid with air dust, where the air dust is the calibration dust. In the present invention, multiple hand-operated samplers use the experimental filters in each group to perform parallel sampling in the air. Preferably, sampling duration for the groups varies from one another, and more preferably, increases by an arithmetic progression. In the present invention, calibration dust collection duration, that is, the sampling duration, is preferably relevant to the air conditions on the day of collection.

In some specific embodiments of the present invention, a relationship between the collection duration and the air conditions is preferably shown by Table 1 below:

TABLE 1

Relationship between collection duration and air conditions

| Concentration average values (µg/m³) of PM2.5 in 24 h | AQI Air quality index AQI | Air quality levels | AQI classifications | Sampling duration (h) |
|---|---|---|---|---|
| 0 to 35 | 1 to 50 | First level | Excellent | 8, 12, 16 . . . |
| 35 to 75 | 51 to 100 | Second level | Good | 6, 8, 10 . . . |
| 75 to 115 | 101 to 150 | Third level | Mild contamination | 4, 5, 6 . . . |
| 115 to 150 | 151 to 200 | Fourth level | Middle level contamination | 3, 4, 5 . . . |
| 150 to 250 | 201 to 300 | Fifth level | Heavy contamination | 2, 3, 4 . . . |
| 550 to 550 | >300 | Sixth level | Severe contamination | 1, 2, 3 . . . |

Note:
In Table 1 of the present invention, the ellipsis refers to that the sampling duration of the groups is preferably set according to the given arithmetic progression. For example, if there are a total of four groups of samples, the sampling duration of the first group is 8 hours, the sampling duration of the second group is 12 hours, the sampling duration of the third group is 16 hours, and the sampling duration of the fourth group is 20 hours.

In the present invention, after the calibration dust is collected, a PM hand-operated monitor is preferably used to manually perform sampling, according to the sampling duration, for the filters to which the calibration dust is adhered. In some specific embodiments of the present invention, the PM hand-operated monitor is preferably an LVS+ SEQ (PNS16-3.1) separated-mode particulate sampling system capable of automatically replacing filters, produced by Comde-Derenda Company. In the present invention, preferably, one group of filters is applied in one PM hand-operated monitor. Multiple PM hand-operated monitors are used to perform parallel sampling for the multiple groups of filters. In a manual sampling period of the present invention, a beta attenuation suspended particulate analyzer is preferably used at the same time, so as to obtain data used for subsequent calibration.

In the present invention, after collection of the calibration dust, second-grade stable basal filters to which the calibration dust is adhered are obtained and then weighed, to obtain a mass difference value before and after the sampling of the filters. Then, PM mass concentration is calculated. In the present invention, the filters to which the calibration dust is adhered are weighed preferably under constant temperature and humidity conditions. The temperature in the constant temperature and humidity conditions is preferably 19° C. to 21° C.; and is more preferably 20° C. The humidity in the constant temperature and humidity conditions is 45% to 55%; is more preferably 48% to 53%; and is most preferably 50%. In the present invention, a high-precision weighing scale is preferably used for weighing. The precision of the high-precision weighing scale is preferably 0.01 mg or 0.001 mg. In the present invention, the filters to which the calibration dust is adhered are weighed preferably by an AWS-1 automatic filter weighing system.

After the PM mass concentration is calculated, the initial intensity of the beta ray when no filter is placed is measured by using the external diaphragm measurement function of the beta attenuation particulate analyzer, and the intensity is recorded as I′. The second-grade stable basal filter to which the calibration dust is adhered is placed on the filter holder. The intensity of the beta ray on different point positions set according to step (2) is measured, and is recorded as I‴, to obtain ln(I′/I‴) values of the different point positions, n being mark numbers of the different point positions. The same second-grade stable basal filter to which the calibration dust is adhered is screened, and it is used as a calibration dust filter if the variable coefficient CV for ln(I′/I‴) values of the different point positions thereof is less than or equal to 0.20%.

In the present invention, the obtained calibration dust filters can be preserved for a period of time. In the present invention, the calibration dust filters are preferably preserved in a sealed and light-proof environment. In the present invention, the temperature of the environment in which the calibration dust filters are preserved is preferably −20° C. to 8° C.; is more preferably −10° C. to 5° C.; and is most preferably 0° C. to 4° C. In the present invention, the calibration dust filters can be preserved for 30 days at the longest.

The present invention further provides a method for off-site calibration using the calibration dust filter, which includes the following steps:

a. The intensity of the beta ray on different point positions on a reserved blank comparison filter is measured by using an external diaphragm measurement function of a beta attenuation particulate analyzer, and the intensity is recorded as $I_n$. An average of the $I_n$ values is calculated to obtain average intensity of the beta ray for the blank comparison filters, and the intensity is recorded as $\overline{I_n}$. An average of the $I'''$ values of different point positions on each calibration dust filter is calculated to obtain average intensity of the beta ray for each calibration dust filter, and the intensity is recorded as $\overline{I'''}$. A value of a correction factor K is calculated according to Equation I:

$$K = \frac{\Delta m}{S \cdot t_m} \qquad \text{Equation I}$$

where in Equation I:

S represents the area of the dust filter, using cm² as a unit;

Δm represents a mass difference value before and after sampling of the filters, using mg as a unit; and $t_m$ represents the mass thickness, using mg/cm² as a unit, where $t_m$ is calculated according to Equation II:

$$t_m = \frac{\ln(\overline{I_n}/\overline{I'''})}{\mu_m} \qquad \text{Equation II}$$

where in Equation II, $\mu_m$ is the mass absorption coefficient, and the empirical value is 0.29 cm²/mg.

b. The beta attenuation particulate analyzer is corrected and calibrated by using the obtained value of the correction factor K.

In the present invention, the correction and calibration is as follows: substituting the correction factor K into Equation III, to obtain a corrected particulate matter concentration after calculation:

$$C = \frac{S}{V} \cdot t_m \cdot k \qquad \text{Equation III}$$

where in Equation III:

S represents the area of the dust filter, using cm² as a unit;

V represents the volume under standard conditions, using m³ as a unit;

$t_m$ represents the mass thickness, using mg/cm2 as a unit; and

K represents the obtained correction factor.

The following describes a method for processing a filter to obtain a calibration dust filter, and a method for off-site calibration using the calibration dust filter in detail below with reference to an embodiment. However, the description should not be construed as a limitation to the protection scope of the present invention.

Embodiment 1

A rectangular filter of 203*254 mm produced by Pall Corporation is selected. Quartz filters that have small color difference and uniform thickness, no pinholes, and no burrs on the whole are used as basal filters. The filters are baked by using a muffle furnace. The temperature rise curve in the muffle furnace is as follows: The room temperature rises to 300° C. at a rate of 5° C./min, and the temperature keeps constant at 300° C. for 2 h; the temperature rises from 300° C. to 500° C. at a rate of 5° C./min, and keeps constant at 500° C. for 2 h; the temperature rises from 500° C. to 900° C. at a rate of 10° C./min, and keeps constant at 900° C. for 1 h; and then the temperature reduces naturally.

Upon a test, the filters meet the following standards for fundamental screening:

a. the aperture diameter and thickness: the aperture diameter is less than or equal to 2 μm, and the thickness ranges from 0.2 mm to 0.25 mm;

b. the interception efficiency: the interception efficiency for 0.3 μm particulate matter is greater than or equal to 99% when the basal filter is used as a sampling filter for PM10; and the interception efficiency for 0.3 μm particulate matter is greater than or equal to 99.7% when the basal filter is used as a sampling filter for PM2.5;

c. the maximum pressure drop: the pressure drop is less than or equal to 3 KPa at the clean air flow rate of 0.45 m/s;

d. the maximum moisture absorption: mass increments obtained after the basal filter is exposed to the air with the humidity of 40% RH and the humidity of 35% RH separately for 24 hours are less than or equal to 10 μg; and e. weight stability: filters, the number of which is not less than 0.1% of the total number of filters in each batch, are selected, and are weighed after they are stabilized in equilibrium; and the mass of the filters is recorded.

The filters that have been weighed in equilibrium are placed into a filter clip, the filter clip is made to freely fall to a flat hard surface from the height of 25 cm, and the foregoing operations are repeated twice. The tested filters are taken out of the filter clip, and are weighed. Mass values thereof are recorded, where a change of average mass before and after the falling test is less than or equal to 20 μg.

The filters that have been weighed in equilibrium are dried at 40±2° C. for 48 hours, and then the dried filters are weighed again in equilibrium, where a change of average mass before and after the test is less than or equal to 20 μg.

The filter is cropped into a circular shape with the diameter of 30 mm, and then a beta attenuation particulate analyzer is used for detection. The analyzer used in this embodiment is the Model 7201 beta attenuation suspended particulate analyzer produced by Beijing Zhong Sheng Tai Ke Environment Science & Technology Development Co., Ltd. A paper bag of the analyzer is taken down. The initial intensity of the beta ray when no filter is placed is measured by using an external diaphragm measurement function of the instrument, and the intensity is recorded as I. The blank basal filter to be measured is placed on a filter holder (a circular hole, opened on a monitoring region, with the diameter of 30 mm), and the filter holder is equally divided at an angle of 45° with 8 different point positions, where the point positions are sequentially numbered as 1, 2, 3, 4, 5, 6, 7, and 8 (as shown in FIG. 1). The point positions are marked on the edge of the filter. Then, the intensity values I″ of the beta ray on the 8 different point positions are measured by rotating the filter. The initial intensity of the beta ray is re-measured before the intensity values I″ of the beta ray are measured each time, and is recorded. The CV of ln(I/I″) values of the different point positions on the same basal filter are less than or equal to 0.20%. An average of the ln(I/I″) values of the different point positions on the basal filters with the variable coefficient CV less than or equal to 0.20% is calculated. Finally, ten stable basal filters for which the CVs of the ln(I/I″) averages are less than or equal to 0.25% are screened out from these filters.

The screened-out stable basal filters are placed on the AWS-1 automatic filter weighing system (with the precision of 0.001 mg) produced by Comde-Derenda Company under constant temperature (T:20±1° C.) and humidity (RH: 50±5%) conditions for 24 h in equilibrium; and then are weighed.

After the initial mass of the stable basal filters is obtained, the screened-out stable basal filters are divided into 3 groups each having three filters. The remaining one filter is used as a blank filter. Calibration dust is collected from Jun. 2, 2016 to Jun. 3, 2016. The AQI on the day of collection is good, and sampling duration of the three groups is set to 6 h, 8 h, and 10 h respectively.

Before sampling, indexes such as temperature, humidity, pressure, flow, cutting efficiency of a cutter, and air impermeability of three LVS+SEQ (PNS16-3.1) separated-mode particulate sampling systems capable of automatically replacing filters are tested, where the sampling system is produced by Comde-Derenda Company, to ensure that the indexes of the hand-operated monitor all meet the standard requirements. After completion of testing the hand-operated instruments, sampling is performed for the three groups of filters. Operation periods of the instruments are set to 6 h, 8 h, and 10 h respectively. The three instruments perform parallel sampling at the same time. The Model 7201 beta attenuation suspended particulate analyzer is also operated during sampling, with a period of 1 h.

After sampling completion of the hand-operated instruments, the filters to which calibration dust is adhered is placed on the AWS-1 automatic filter weighing system under constant temperature (T:20±1° C.) and humidity (RH: 50±5%) conditions for 24 h in equilibrium; and then are weighed. A mass difference value before and after the sampling of the filters is calculated, to obtain PM mass concentration (unit: $mg/m^3$) shown by Table 2:

TABLE 2

PM mass concentration of filters

| Groups | 1 | 2 | 3 | CV |
|---|---|---|---|---|
| First group | 0.050 | 0.051 | 0.049 | 2.00% |
| Second group | 0.067 | 0.069 | 0.068 | 1.47% |
| Third group | 0.060 | 0.058 | 0.061 | 2.56% |

The initial intensity of the beta ray when no filter is placed is measured by using the external diaphragm measurement function of the beta attenuation particulate analyzer, and the intensity is recorded as I'. The filter to which regional reference dust is adhered is placed on a filter holder. The intensity values I‴ of the beta ray on different point positions are successively measured according to point position marks. Upon measurement, there are 9 filters of which CVs of ln(I'/I‴) values of the different point positions are less than or equal to 0.20%. These filters all meet the uniformity requirement.

The intensity values I″ of the beta ray on different point positions on reserved blank basal filters are measured by using the external diaphragm measurement function of the beta attenuation particulate analyzer, and then an average of the values I″ is calculated to obtain $\overline{I_n}$. The filters to which calibration dust is adhered are placed on the filter holder. Values I‴ of different point positions are measured, and then an average of the values I‴ is calculated to obtain I‴. A correction factor K=0.873 is calculated according to $$K = \frac{\Delta m}{S \cdot t_m}.$$

After preparation of the calibration dust filters, the calibration dust filters are preserved in a filter box at 0° C. in a sealed and light-proof environment. Reproducibility of the calibration dust filters preserved at 0° C. in a sealed and light-proof environment is tested. It is shown by a result that the CV is less than or equal to 2.5% on the whole. Therefore, it is feasible that the calibration dust filters are preserved at 0° C. in a sealed and light-proof environment. When it is required to perform off-site calibration for a beta automatic instrument by using the calibration dust filters, the filters should be placed in an incubator with ice packs and then transported. The calibration dust filters should be timely put back into the incubator for preservation after use.

The beta attenuation suspended particulate analyzer is correction, and a comparison between concentrations (unit: $mg/m^3$) before and after the correction using K=0.873 is shown by Table 3:

TABLE 3

PM mass concentration before and after correction

| Manually measured concentration | Automatically measured concentration | | CV | |
|---|---|---|---|---|
| | Before correction | After correction | Before correction | After correction |
| 0.050 | 0.061 | 0.055 | 14% | 7% |
| 0.068 | 0.085 | 0.077 | 15% | 8% |
| 0.060 | 0.076 | 0.069 | 15% | 8% |

It is shown by the results in Table 3 that, when the beta attenuation suspended particulate analyzer is calibrated using the calibration dust filter, the concentration measured by the calibrated beta attenuation suspended particulate analyzer is more closer to the manually measured concentration, thus better reflecting variations in pollution concentration of PM in the air.

The above description of the embodiment is only for helping to understand the method of the present invention and its core idea. It should be noted that, several improvements and modifications may be made by persons of ordinary skill in the art without departing from the principle of the present invention, and these improvements and modifications should also be considered within the protection scope of the present invention. Various modifications to these embodiments are readily apparent to persons skilled in the art, and the generic principles defined herein may be practiced in other embodiments without departing from the spirit or scope of the invention. Thus, the present invention is not limited to the embodiments shown herein but falls within the widest scope consistent with the principles and novel features disclosed herein.

What is claimed is:

1. A method for processing a filter to obtain a calibration dust filter, comprising the following steps:
   (1) fundamentally screening basal filters, to obtain blank basal filters to be measured, wherein standards for the fundamental screening are as follows:
   a. the aperture diameter and thickness: the aperture diameter is less than or equal to 2 μm, and the thickness ranges from 0.2 mm to 0.25 mm;
   b. the interception efficiency: the interception efficiency for 0.3 μm particulate matter is greater than or equal to 99% when the basal filters are used as sampling filters for PM10; and the interception efficiency for 0.3 μm particulate matter is greater than or equal to 99.7% when the basal filters are used as sampling filters for PM2.5;
   c. the maximum pressure drop: the pressure drop is less than or equal to 3 KPa at the clean air flow rate of 0.45 m/s;
   d. the maximum moisture absorption: mass increments obtained after the basal filters are exposed to the air with the humidity of 40% RH and the humidity of 35% RH separately for 24 hours are less than or equal to 10 μg; and
   e. weight stability: a change of average mass in a falling test is less than or equal to 20 μg, and a change of average mass in a temperature test is less than or equal to 20 μg;
   (2) measuring, by using an external diaphragm measurement function of a beta attenuation particulate analyzer, the initial intensity of the beta ray when no filter is placed, and recording the intensity as I; placing each of the blank basal filters to be measured on a filter holder, and equally dividing the filter holder at a particular angle with several point positions; measuring the intensity of the beta ray on the different point positions, and recording the intensity as I″, to obtain ln(I/I″) values of the different point positions, n being mark numbers of the different point positions;
   performing stability screening according to the obtained ln(I/I″) values of each of the blank basal filters to be measured: screening each of the blank basal filters to be measured to identify those having a coefficient of variation for ln(I/I″) values of the different point positions of less than or equal to 0.20% as first-grade stable basal filters; and
   calculating an average of ln(I/I″) values of different point positions on each first-grade stable basal filter, to obtain an ln(I/I″) average of each first-grade stable basal filter; and according to the ln(I/I″) averages, screening out at least ten second-grade stable basal filters of which the ln(I/I″) averages have a coefficient of variation of less than or equal to 0.25%;
   (3) weighing the second-grade stable basal filters that are screened out in step (2); and
   (4) reserving at least one second-grade stable basal filter as a blank comparison filter; and dividing the remaining second-grade stable basal filters into at least three groups, each group comprising at least three filters as experimental filters for collecting calibration dust; and weighing the obtained second-grade stable basal filters to which the calibration dust is adhered, to obtain a mass difference value before and after sampling of filters, and calculating PM mass concentration accordingly; and
   (5) measuring, by using the external diaphragm measurement function of the beta attenuation particulate analyzer, the initial intensity of the beta ray when no filter is placed, and recording the intensity as I′; placing each of the second-grade stable basal filters to which the calibration dust is adhered on the filter holder; and measuring the intensity of the beta ray on different point positions set according to step (2), and recording the intensity as I‴, to obtain ln(I′/I‴) values of different point positions, n being mark numbers of the different point positions; and
   screening out each of the second-grade stable basal filters to which the calibration dust is adhered to identify those having a coefficient of variation for ln(I′/I‴) values of the different point positions of less than or equal to 0.20% as calibration dust filters.

2. The method according to claim 1, wherein the basal filters are cellulose filters, glass filters, quartz fiber filters, teflon filters, or polycarbonate filters.

3. The method according to claim 2, wherein when the basal filters are quartz fiber filters, and the quartz filters are baked.

4. The method according to claim 3, wherein the baking temperature is 800° C. to 900° C.; and
   the baking duration is 30 to 90 minutes.

5. The method according to claim 4, wherein the temperature rises to the baking temperature in a temperature rise manner of first temperature rising, first temperature preservation, second temperature rising, second temperature preservation, and then third temperature rising.

6. The method according to claim 5, wherein the rise rate of the first temperature rising is 4° C./min to 6° C./min;
   the temperature in the first temperature preservation is 290° C. to 310° C.; and
   the duration of the first temperature preservation is 1 hour to 3 hours.

7. The method according to claim 5, wherein the rise rate of the second temperature rising is 4° C./min to 6° C./min;
   the temperature in the second temperature preservation is 490° C. to 510° C.; and
   the duration of the second temperature preservation is 1 hour to 3 hours.

8. The method according to claim 5, wherein the rise rate of the third temperature rising is 9° C./min to 11° C./min.

9. The method according to claim 5, wherein a method for testing the weight stability is as follows:
   selecting filters, the number of which is not less than 0.1% of the total number of the basal filters, weighing them after they reach stabilization in equilibrium, and recording the mass of the filters, wherein the stabilization in equilibrium is characterized by the temperature of 15° C. to 30° C., relative humidity of 45% to 55%, and a duration of the stabilization in equilibrium of 20 hours to 30 hours;
   placing the filters that have been weighed in equilibrium into a filter clip, making the filter clip freely fall to a flat hard surface from the height of 25 cm, and repeating the steps of placing the filters into the filter clip and making the filter clip freely fall to a flat hard surface from the height of 25 cm twice; and taking the tested filters out of the filter clip, and weighing the tested filters and recording mass values, wherein a change of average mass before and after the falling test is less than or equal to 20 μg; and drying the filters that have been weighed in equilibrium at 40±2° C. for 48 hours, and then weighing the dried filters again in equilibrium, where a change of average mass before and after the test is less than or equal to 20 µg.

10. The method according to claim 4, wherein a method for testing the weight stability is as follows:

selecting filters, the number of which is not less than 0.1% of the total number of the basal filters, weighing them after they reach stabilization in equilibrium, and recording the mass of the filters, wherein the stabilization in equilibrium is characterized by the temperature of 15° C. to 30° C., relative humidity of 45% to 55%, and a duration of the stabilization in equilibrium of 20 hours to 30 hours;

placing the filters that have been weighed in equilibrium into a filter clip, making the filter clip freely fall to a flat hard surface from the height of 25 cm, and repeating the steps of placing the filters into the filter clip and making the filter clip freely fall to a flat hard surface from the height of 25 cm twice; and taking the tested filters out of the filter clip, and weighing the tested filters and recording mass values, wherein a change of average mass before and after the falling test is less than or equal to 20 µg; and drying the filters that have been weighed in equilibrium at 40±2° C. for 48 hours, and then weighing the dried filters again in equilibrium, where a change of average mass before and after the test is less than or equal to 20 µg.

11. The method according to claim 3, wherein a method for testing the weight stability is as follows:

Selecting filters, the number of which is not less than 0.1% of the total number of the basal filters, weighing them after they reach stabilization in equilibrium, and recording the mass of the filters, wherein the stabilization in equilibrium is characterized by the temperature of 15° C. to 30° C., relative humidity of 45% to 55%, and a duration of the stabilization in equilibrium of 20 hours to 30 hours;

placing the filters that have been weighed in equilibrium into a filter clip, making the filter clip freely fall to a flat hard surface from the height of 25 cm, and repeating the steps of placing the filters into the filter clip and making the filter clip freely fall to a flat hard surface from the height of 25 cm twice; and taking the tested filters out of the filter clip, and weighing the tested filters and recording mass values, wherein a change of average mass before and after the falling test is less than or equal to 20 µg; and drying the filters that have been weighed in equilibrium at 40±2° C. for 48 hours, and then weighing the dried filters again in equilibrium, where a change of average mass before and after the test is less than or equal to 20 µg.

12. The method according to claim 2, wherein a method for testing the weight stability is as follows:

selecting filters, the number of which is not less than 0.1% of the total number of the basal filters, weighing them after they are stabilized in equilibrium, and recording the mass of the filters, wherein the stabilization in equilibrium is characterized by the temperature of 15° C. to 30° C., relative humidity of 45% to 55%, and a duration of the stabilization in equilibrium of 20 hours to 30 hours;

placing the filters that have been weighed in equilibrium into a filter clip, making the filter clip freely fall to a flat hard surface from the height of 25 cm, and repeating the steps of placing the filters into the filter clip and making the filter clip freely fall to a flat hard surface from the height of 25 cm twice; and taking the tested filters out of the filter clip, and weighing the tested filters and recording mass values, wherein a change of average mass before and after the falling test is less than or equal to 20 µg; and drying the filters that have been weighed in equilibrium at 40±2° C. for 48 hours, and then weighing the dried filters again in equilibrium, where a change of average mass before and after the test is less than or equal to 20 µg.

13. The method according to claim 1, wherein a method for testing the weight stability is as follows:

selecting filters, the number of which is not less than 0.1% of the total number of the basal filters, weighing them after they are stabilized in equilibrium, and recording the mass of the filters; wherein the stabilization in equilibrium is characterized by the temperature of 15° C. to 30° C., relative humidity of 45% to 55%, and a duration of the stabilization in equilibrium of 20 hours to 30 hours;

placing the filters that have been weighed in equilibrium into a filter clip, making the filter clip freely fall to a flat hard surface from the height of 25 cm, and repeating the steps of placing the filters into the filter clip and making the filter clip freely fall to a flat hard surface from the height of 25 cm twice; and taking the tested filters out of the filter clip, and weighing the tested filters and recording mass values, wherein a change of average mass before and after the falling test is less than or equal to 20 µg; and drying the filters that have been weighed in equilibrium at 40±2° C. for 48 hours, and then weighing the dried filters again in equilibrium, where a change of average mass before and after the test is less than or equal to 20 µg.

14. The method according to claim 13, wherein the temperature during the stabilization in equilibrium is 15° C. to 30° C.;

the relative humidity during the stabilization in equilibrium is 45% to 55%; and the duration of the stabilization in equilibrium is 20 hours to 30 hours.

15. A method for off-site calibration using a calibration dust filter, comprising the following steps:

g. obtaining a calibration dust filter according to the method described in claim 14;

h. measuring, by using an external diaphragm measurement function of a beta attenuation particulate analyzer, the intensity of the beta ray on different point positions on the blank comparison filter reserved in step (4) of claim 1, and recording the intensity as In; calculating an average of the In values to obtain average intensity of the beta ray for the blank comparison filter, and recording the intensity as $\overline{I_n}$; calculating an average of the I'n values of different point positions on each calibration dust filter obtained in step (5) of claim 1, to obtain average intensity of the beta ray for each calibration dust filter, and recording the intensity as $\overline{I'^n}$; and calculating a value of a correction factor K according to Equation I:

$$K = \frac{\Delta m}{S \cdot t_m} \qquad \text{Equation I}$$

wherein in Equation I:

S represents the area of the dust filter, using cm² as a unit;

Δm represents a mass difference value before and after sampling of the filters, using mg as a unit; and $t_m$ represents the mass thickness, using mg/cm² as a unit, wherein $t_m$ is calculated according to Equation II:

$$t_m = \frac{\ln(\overline{I_n/I'''})}{\mu_m} \quad \text{Equation II}$$

wherein in Equation II, μm is the mass absorption coefficient, and the empirical value is 0.29 cm²/mg.

i. correcting and calibrating the beta attenuation particulate analyzer by using the obtained value of the correction factor K.

16. The method according to claim 1, wherein the particular angle is 90°, 60°, 45°, 30° or 20°.

17. The method according to claim 1, wherein the weighing in steps (3) and (4) is performed individually under constant temperature and humidity conditions;

the temperature in the constant temperature and humidity conditions is 19° C. to 21° C.; and the humidity in the constant temperature and humidity conditions is 45% to 55%.

18. A method for off-site calibration using a calibration dust filter, comprising the following steps:

a. obtaining a calibration dust filter according to the method described in claim 1;

b. measuring, by using an external diaphragm measurement function of a beta attenuation particulate analyzer, the intensity of the beta ray on different point positions on the blank comparison filter reserved in step (4) of claim 1, and recording the intensity as $I_n$; calculating an average of the $I_n$ values to obtain average intensity of the beta ray for the blank comparison filter, and recording the intensity as $\overline{I_n}$; calculating an average of the $I'''$ values of different point positions on each calibration dust filter obtained in step (5) of claim 1, to obtain average intensity of the beta ray for each calibration dust filter, and recording the intensity as $\overline{I'''}$; and calculating a value of a correction factor K according to Equation I:

$$K = \frac{\Delta m}{S \cdot t_m} \quad \text{Equation I}$$

wherein in Equation I:

S represents the area of the dust filter, using cm² as a unit;

Δm represents a mass difference value before and after sampling of the filters, using mg as a unit; and $t_m$ represents the mass thickness, using mg/cm² as a unit, wherein $t_m$ is calculated according to Equation II:

$$t_m = \frac{\ln(\overline{I_n/I'''})}{\mu_m} \quad \text{Equation II}$$

wherein in Equation II, μm is the mass absorption coefficient, and the empirical value is 0.29 cm²/mg.

c. correcting and calibrating the beta attenuation particulate analyzer by using the obtained value of the correction factor K.

19. The method according to claim 18, wherein the correction and calibration is as follows: substituting the correction factor K into Equation III, to obtain corrected concentration of particulate matter after calculation:

$$C = \frac{S}{V} \cdot t_m \cdot k \quad \text{Equation III}$$

wherein in Equation III:

S represents the area of the dust filter, using cm² as a unit;

V represents the sample air volume under standard conditions, using m³ as a unit;

$t_m$ represents the mass thickness, using mg/cm² as a unit; and

K represents the obtained correction factor.

* * * * *